US009268674B1

(12) United States Patent
Ben-Cnaan (10) Patent No.: US 9,268,674 B1
(45) Date of Patent: Feb. 23, 2016

(54) SYSTEM, METHOD, AND COMPUTER PROGRAM FOR MONITORING TESTING PROGRESS OF A SOFTWARE TESTING PROJECT UTILIZING A DATA WAREHOUSE ARCHITECTURE

(71) Applicant: Amdocs Software Systems Limited, Dublin (IE)

(72) Inventor: Talmon Ben-Cnaan, Tzur-Yitzhak (IL)

(73) Assignee: Amdocs Software Systems Limited, Dublin (IE)

( * ) Notice: Subject to any disclaimer, the term of this patent is extended or adjusted under 35 U.S.C. 154(b) by 0 days.

(21) Appl. No.: 14/259,067

(22) Filed: Apr. 22, 2014

Related U.S. Application Data

(60) Provisional application No. 61/820,728, filed on May 8, 2013.

(51) Int. Cl.
*G06F 9/45* (2006.01)
*G06F 11/36* (2006.01)
*G06Q 10/06* (2012.01)

(52) U.S. Cl.
CPC ............ *G06F 11/3688* (2013.01); *G06Q 10/06* (2013.01); *G06Q 10/0635* (2013.01)

(58) Field of Classification Search
None
See application file for complete search history.

(56) References Cited

U.S. PATENT DOCUMENTS

| | | | |
|---|---|---|---|
| 6,601,017 B1 * | 7/2003 | Kennedy et al. | 702/182 |
| 8,213,871 B1 * | 7/2012 | Cogan | 455/67.11 |
| 8,418,147 B1 * | 4/2013 | Odenwelder et al. | 717/128 |
| 8,701,078 B1 * | 4/2014 | Holler et al. | 717/101 |

(Continued)

FOREIGN PATENT DOCUMENTS

WO    WO 2007/057296    *    5/2007    ............ G06Q 10/00

*Primary Examiner* — Isaac T Tecklu
(74) *Attorney, Agent, or Firm* — Zilka-Kotab, PC (57) ABSTRACT

A system, method, and computer program product are provided for monitoring testing progress of a software testing project utilizing a data-warehouse architecture. In use, at least one current software testing project is monitored. Current information such as defect information and test case information associated with the at least one current software testing project are received. Additionally, test planning information associated with the at least one current software testing project is received, the test planning information including test plans for the at least one current software testing project. In addition, overall project planning information is received, including performance metrics associated with the at least one current software testing project. Further, the current defect information, the current test case information, the test planning information, and the overall project planning information associated with the at least one test are stored in at least one centralized data repository, the at least one centralized data repository further including historical test data associated with one or more past software testing projects. Furthermore, data associated with at least one user request is retrieved from the at least one centralized data repository, the data associated with at least one user request corresponding to at least one of the current defect information, the current test case information, the test planning information, the overall project planning information, or the historical test data. Still yet, the data associated with the at least one user request is transformed into a format for display. Moreover, one or more reports are generated utilizing the transformed data, the one or more reports including user modifiable reports and being associated with a test progress of the at least one current software testing project.

19 Claims, 6 Drawing Sheets

(56) References Cited

U.S. PATENT DOCUMENTS

| | | |
|---|---|---|
| 8,739,047 B1* | 5/2014 | Holler et al. .................. 715/759 |
| 2005/0283751 A1* | 12/2005 | Bassin et al. .................. 717/100 |
| 2006/0174170 A1* | 8/2006 | Garland et al. ................. 714/57 |
| 2006/0190922 A1* | 8/2006 | Chen ............................. 717/100 |
| 2007/0174702 A1* | 7/2007 | Meyer ............................ 714/33 |
| 2007/0226546 A1* | 9/2007 | Asthana et al. ................ 714/47 |
| 2010/0057693 A1* | 3/2010 | Himstedt et al. ............... 707/3 |
| 2011/0296371 A1* | 12/2011 | Marella ......................... 717/101 |
| 2012/0159422 A1* | 6/2012 | McClamroch et al. ....... 717/101 |
| 2014/0325487 A1* | 10/2014 | Maczuba ....................... 717/128 |

\* cited by examiner

SYSTEM, METHOD, AND COMPUTER PROGRAM FOR MONITORING TESTING PROGRESS OF A SOFTWARE TESTING PROJECT UTILIZING A DATA WAREHOUSE ARCHITECTURE

CLAIM OF PRIORITY

This application claims the benefit of U.S. Provisional Application No. 61/820,728, filed May 8, 2013, the entire contents of which are incorporated herein by reference.

FIELD OF THE INVENTION

The present invention relates to the management of software development projects, and more particularly to testing stages of such software development projects.

BACKGROUND

The testing of software is an important step in the software development lifecycle. The objective of the testing is typically to verify and validate the integration of the software, the hardware and their configuration, and to prevent malfunction when the software is in use.

Software testing is typically performed after the development of the software is completed, and therefore the testing period is in the critical path of the overall software project. Reporting of the progress of the testing and tracking the defects that are detected, analyzed, fixed and retested is crucial to ensure that the software will go to production with minimal risk of malfunction.

Several defect management tools are available. These tools record, among other things, the defects and their details. The attributes that are associated with a defect enable users to track the defect until it is fixed and validated, and also enable the generation of managerial reports. Currently available reports are typically based on counting defects, test cases and similar parameters, filtering and sorting the data and hence generating reports.

In complex projects, several parts of the software are developed and tested in parallel. In such cases, many reports are generated by various teams. These reports are then combined into a smaller number of accrual reports, to understand the overall status and identify risks. Various data sources are needed to compose these reports. Current reports are labor intensive, require manual and error-prone work, and are usually not flexible enough for receiving ad-hoc information, which is not already constructed in the current reports.

There is thus a need for addressing these and/or other issues associated with the prior art.

SUMMARY

A system, method, and computer program product are provided for monitoring testing progress of a software testing project utilizing a data-warehouse architecture. In use, at least one current software testing project is monitored. Current information such as defect information and test case information associated with the at least one current software testing project are received. Additionally, test planning information associated with the at least one current software testing project is received, the test planning information including test plans for the at least one current software testing project. In addition, overall project planning information is received, including performance metrics associated with the at least one current software testing project. Further, the current defect information, the current test case information, the test planning information, and the overall project planning information associated with the at least one test are stored in at least one centralized data repository, the at least one centralized data repository further including historical test data associated with one or more past software testing projects. Furthermore, data associated with at least one user request is retrieved from the at least one centralized data repository, the data associated with at least one user request corresponding to at least one of the current defect information, the current test case information, the test planning information, the overall project planning information, or the historical test data. Still yet, the data associated with the at least one user request is transformed into a format for display. Moreover, one or more reports are generated utilizing the transformed data, the one or more reports including user modifiable reports and being associated with a test progress of the at least one current software testing project.

DETAILED DESCRIPTION

Figure 1:
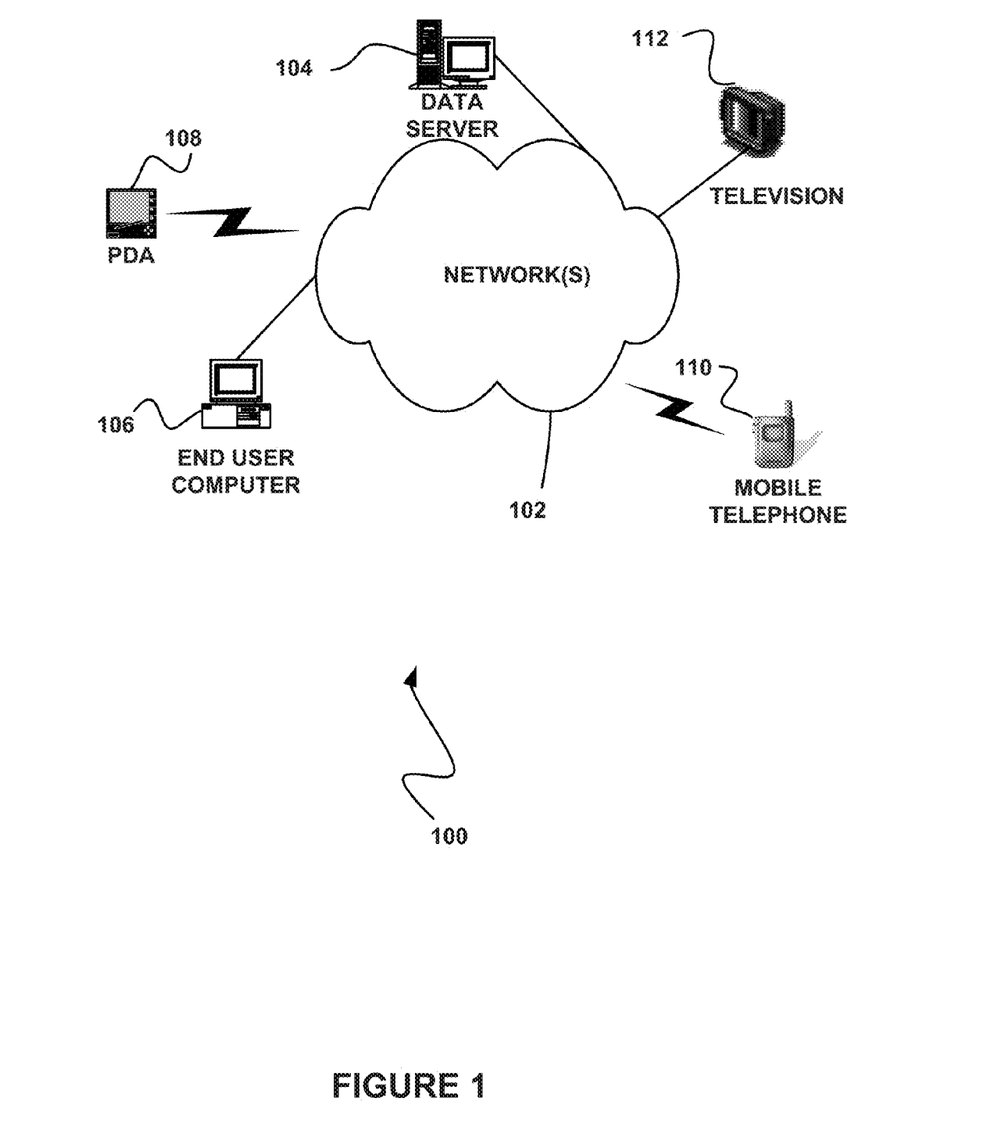
FIG. 1 illustrates a network architecture, in accordance with one possible embodiment.

FIG. 1 illustrates a network architecture 100, in accordance with one possible embodiment. As shown, at least one network 102 is provided. In the context of the present network architecture 100, the network 102 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 102 may be provided.

Coupled to the network 102 is a plurality of devices. For example, a server computer 104 and an end user computer 106 may be coupled to the network 102 for communication purposes. Such end user computer 106 may include a desktop computer, lap-top computer, and/or any other type of logic. Still yet, various other devices may be coupled to the network 102 including a personal digital assistant (PDA) device 108, a mobile phone device 110, a television 112, etc.

Figure 2:
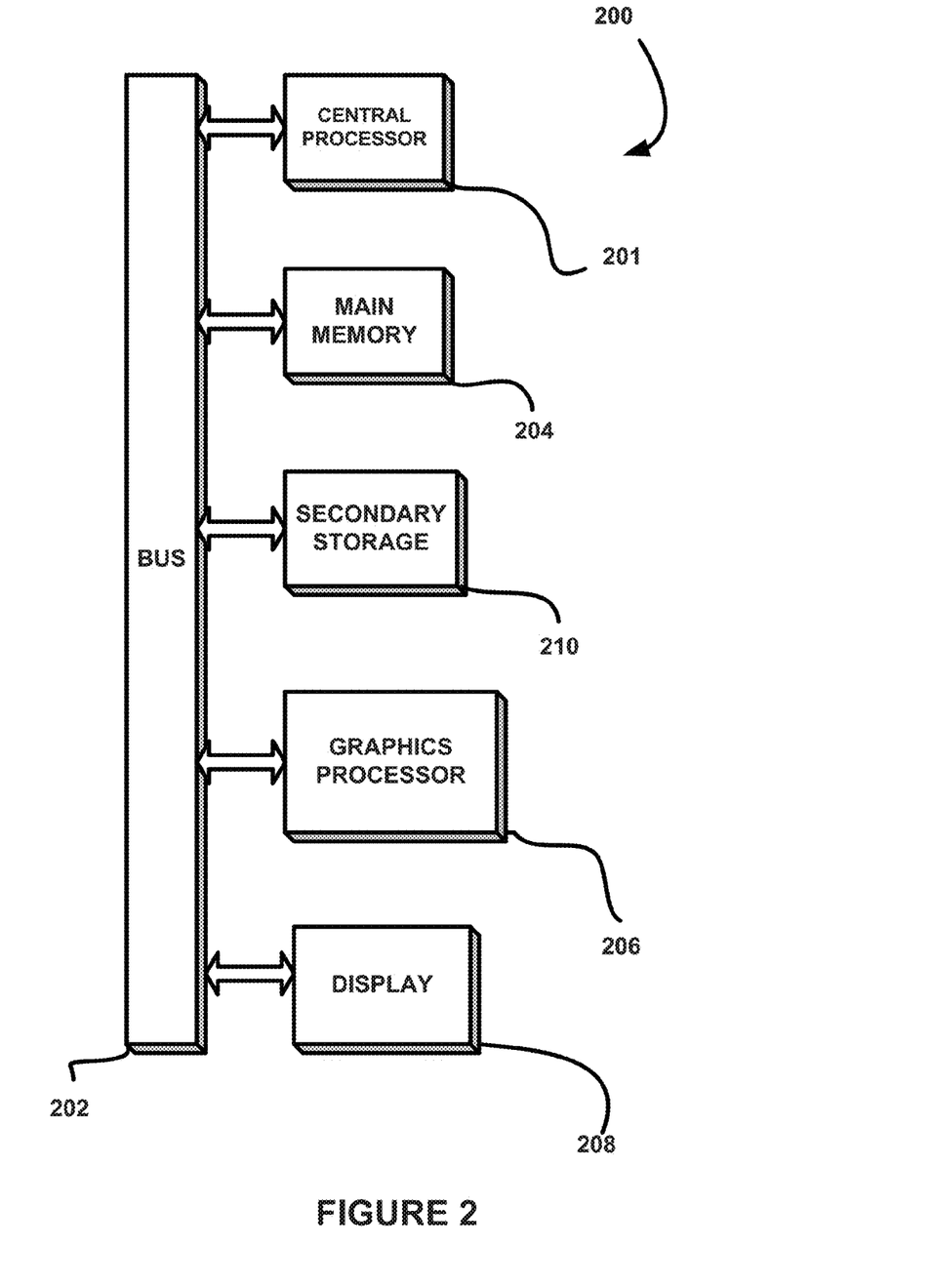
FIG. 2 illustrates an exemplary system, in accordance with one embodiment.

FIG. 2 illustrates an exemplary system 200, in accordance with one embodiment. As an option, the system 200 may be implemented in the context of any of the devices of the network architecture 100 of FIG. 1. Of course, the system 200 may be implemented in any desired environment.

As shown, a system 200 is provided including at least one central processor 201 which is connected to a communication bus 202. The system 200 also includes main memory 204 [e.g. random access memory (RAM), etc.]. The system 200 also includes a graphics processor 206 and a display 208.

The system 200 may also include a secondary storage 210. The secondary storage 210 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 204, the secondary storage 210, and/or any other memory, for that matter. Such computer programs, when executed, enable the system 200 to perform various functions (to be set forth below, for example). Memory 204, storage 210 and/or any other storage are possible examples of tangible computer-readable media.

Figure 3:
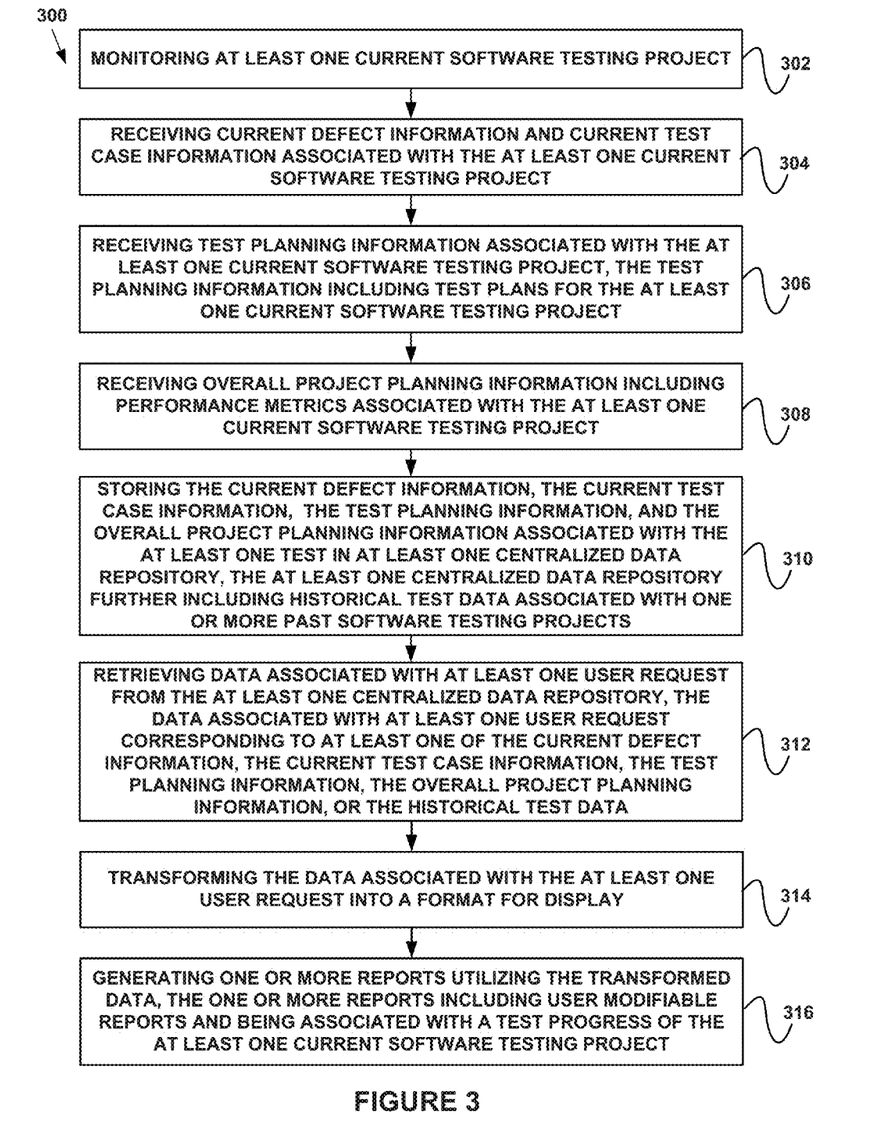
FIG. 3 illustrates a method for monitoring testing progress of a software testing project utilizing a data warehouse architecture, in accordance with one embodiment.

FIG. 3 illustrates a method 300 for monitoring testing progress of a software testing project utilizing a data-warehouse architecture, in accordance with one embodiment. As an option, the method 300 may be carried out in the context of the details of FIGS. 1 and/or 2. Of course, however, the method 300 may be carried out in any desired environment. Further, the aforementioned definitions may equally apply to the description below.

As shown, at least one current software testing project is monitored. See operation 302. The current software testing project may include any type of software testing project. In one embodiment, the software testing project may be associated with a telecommunications service provider software.

Further, in various embodiments, the software testing project may be monitored for progress, test defects, test cases, and/or for various other information associated with the software testing project. Furthermore, in various embodiments, various components may be utilized to facilitate the monitoring, such as one or more defect management tools, one or more Extract, Transform, Load (ETL) modules, one or more centralized data warehouses, and/or various other components. Additionally, in various embodiments, various software modules and/or hardware components may be utilized to monitor the projects.

As shown further in FIG. 3, current information such as defect information and test case information associated with the at least one current software testing project is received. See operation 304. Defect information and test case information may include any type of information, such as parameters and/or attributes associated with defects and/or the test cases. Additional information may include availability of testers, availability of test environments, and more.

Additionally, test planning information associated with the at least one current software testing project is received, the test planning information including test plans for the at least one current software testing project. See operation 306. Such test planning information may include information such as, for example, the number of test cases to be executed per day or week, the testers who are assigned to perform the test cases, the test environments on which test will be executed, etc.

In addition, overall project planning information is received, including performance metrics associated with the at least one current software testing project. See operation 308. The overall project planning information may include information such as, for example, project targets or KPIs (Key Performance Indicators) associated with the project.

Further, the current defect information, the current test case information, the test planning information, and the overall project planning information associated with the at least one test are stored in at least one centralized data repository, the at least one centralized data repository further including historical test data associated with one or more past software testing projects. See operation 310. The at least one centralized data repository may also be referred to as a data warehouse, and may include any type of centralized repository or group of repositories.

The historical data is also associated with the characteristics of the project. Attributes of the project type, the test method and the type of the tested application may be collected and stored with the historical data of the test project.

Additionally, in one embodiment, the at least one centralized data repository may function to integrate disparate data sets from various sources. In one embodiment, the integrated disparate data sets may be arranged into hierarchical groups and are associated to the project characteristics.

Furthermore, data associated with at least one user request is retrieved from the at least one centralized data repository, the data associated with at least one user request corresponding to at least one of the current defect information, the current test case information, the test planning information, the overall project planning information, or the historical test data. See operation 312. As an example, a user may send a request to generate a report for the testing project and the data may be retrieved.

Still yet, the data associated with the at least one user request is transformed into a format for display. See operation 314. Such transformation may include, for example, transforming the data that is stored in the centralized repository to tables of data, charts, overall grade indicators, and text, etc.

Moreover, one or more reports are generated utilizing the transformed data, the one or more reports including user modifiable reports and being associated with a test progress of the at least one current software testing project. See operation 316. The reports may include various reports and may be modifiable such that a user can either view a particular area of interest or the user may investigate the data to view details integrated into a report.

In one embodiment, the method 300 may further include identifying a plurality of attributes associated with at least one of the current defect information and the current test case information. In this case, the current defect information and the current test case information may be classified, based on the plurality of attributes. This classification may help a user monitor the software testing project based on the plurality of attributes. For example, the current software testing project may be monitored utilizing the classification based on the plurality of attributes for a specific area of interest.

The attributes may include various information. For example, in one embodiment, the plurality of attributes may include a defect status. In this case, the defect status may include a new status, a fixed status, a verified status, and a closed status.

As another example, the plurality of attributes may include a defect severity. In this case, the defect severity may include a critical severity, a high severity, a medium severity, or a low severity. As another example, the plurality of attributes may include a defect type. In this case, the defect type may include one of a functional type or a performance type.

Furthermore, the plurality of attributes may include a defect origin. In this case, the defect origin may include one of a code origin or a configuration origin.

Still yet, in one embodiment, the method 300 may include maintaining a past project repository. This may include, for example, storing information for each past project of a plurality of past projects, including: a number of detected defects detected at each stage of the past project (each defect with plurality of attributes); the effort invested in a development of each stage of the past project; and a number of escaped defects, which ultimately escaped detection before a deployment of the past project.

Additionally, by identifying similar behavior of projects, the past project repository may be utilized to automatically predict a number of defects predicted to have been found by a current stage of the current software testing project.

In this case, the number of predicted defects may be compared to the number of current defects, and it may be determined whether the number of current defects is higher than the number of predicted defects. Responsive to determining that the number of current defects is higher or lower than the number of predicted defects, an alert may be provided to at least one user (e.g. via one or more of the generated reports, etc.).

Moreover, the rate of predicted defects may be compared to the rate of current detection at any time during the software testing stage. If the current rate is higher or lower than the rate of predicted defects, such alert may be provided at any time during the current testing stage, and a corrective action can be taken.

Further, in one embodiment, the past project repository may further include, for each past project of a plurality of past projects, a past rate of defect closure for each stage of the past project. Additionally, a current rate of defect closure of the at least one current software testing project may be compared to past rates of defect closure of past projects, and responsive to the comparing, a number of future defects which will not be closed before a termination of the at least one current software testing project may automatically be predicted.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 4:
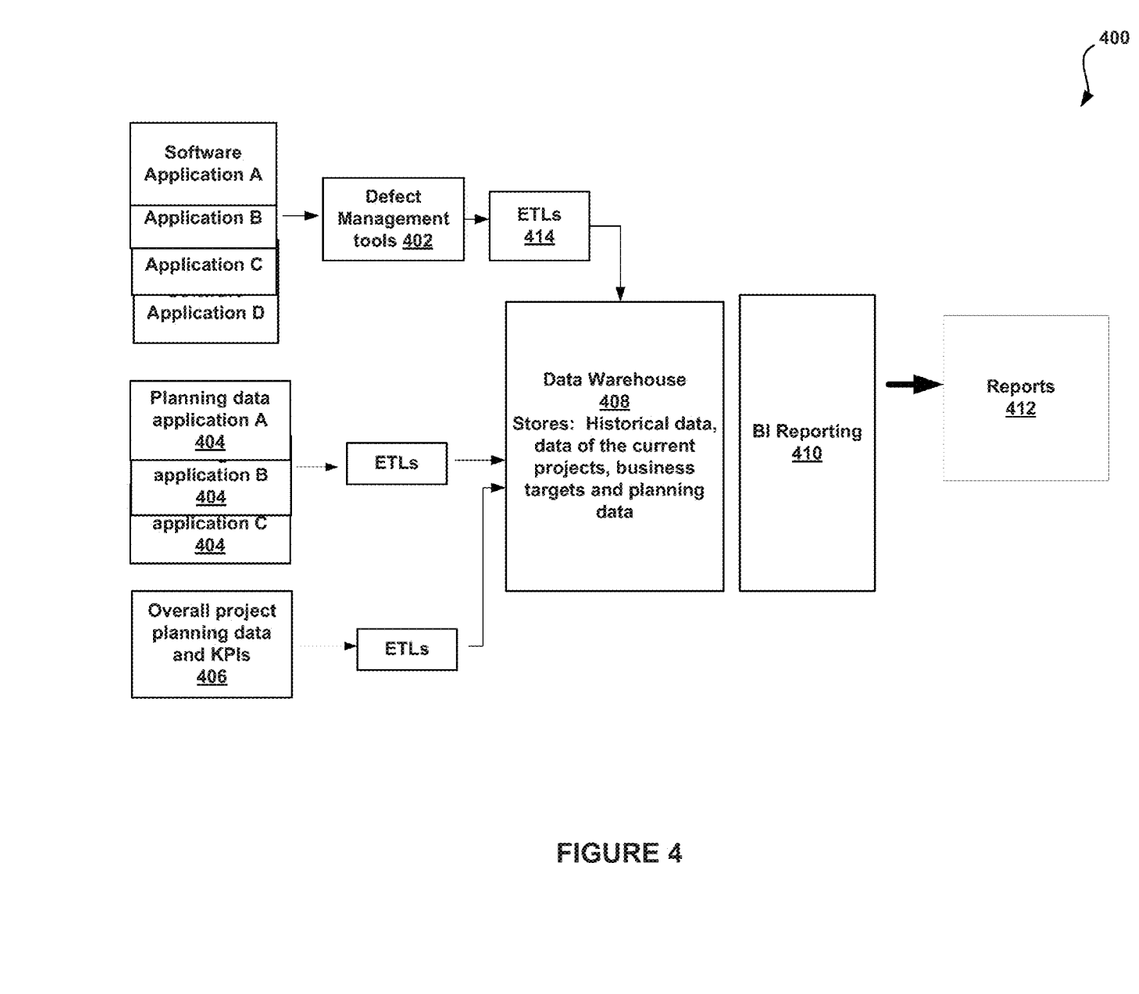
FIG. 4 illustrates a system for monitoring testing progress of a software testing project utilizing a data warehouse architecture, in accordance with one embodiment.

FIG. 4 illustrates a system 400 for monitoring testing progress of a software testing project utilizing a data-warehouse architecture, in accordance with one embodiment. As an option, the system 400 may be implemented in the context of the details of FIGS. 1-3. Of course, however, the system 400 may be implemented in the context of any desired environment. Further, the aforementioned definitions may equally apply to the description below.

As shown, the system 400 includes one of more defect management tools 402, or a repository of data, including records of defects, test cases, and related parameters. Each such repository contains, for example, attributes of defects and test cases.

The attributes enable the classification of the parameters so that the status and progress may be monitored and analyzed per area of interest. Examples of the attributes may include, for example, a defect status (e.g. such as new, fixed, verified, and closed, etc.), a defect severity (e.g. such as critical, high, medium, and low, etc.), a defect type (e.g. such as functional or performance, etc.), and defect origin (e.g. such as code or configuration, and the application to which the code belongs etc.), the testing expert who detected the defect.

The system 400 also includes one or more planning data applications 404. The planning data applications 404 may function to provide data that describes the test plans. For example, the planning data applications 404 may provide the number of test cases to be performed every day, such as 25 test cases per day in the first 5 working days and 50 test cases per day each working day after in a specific business flow. As another example, the planning data applications 404 may provide the number of defects expected to be found each testing week. Comparing actual data with the testing plan data may function to provide an indication of the progress of the testing.

The system 400 further includes one or more Extract, Transform, Load (ETL) modules 414. The ETL modules 414 are software modules that extract data from the defect management tool 402 or a file which stores this data. The ETL modules 414 may manipulate the data according to the requirements and the needs as defined for a data warehouse 408, and load the transformed data to the storage of the data warehouse 408. As an example, in one instance of the defect management tool 402, defect severities are described as "Severity 1, 2, and 3" and in another instance of the defect management tool defect severities are described as "P1, P2, P3, and P4). The ETL 414 maps each severity level to a known standard (for example, Severity 1 and P1 are mapped to severity "Critical"). The ETLs loads the mapped defects severity ("Critical") to the Data-warehouse 408.

The system 400 also includes an overall project planning data repository 406. This data may include the project targets and/or the KPIs (Key Performance Indicators) that are expected for the project. As an example, the data may indicate that no more than two defects of "high" severity may be open one week before the end of test execution.

As shown further, the system 400 includes the data warehouse 408. The data warehouse 408 includes a central repository of data which is created by integrating data from disparate sources. The data warehouse 408 stores current and historical data which are also used for creating trending reports.

The data warehouse 408 integrates the disparate data sets. In one embodiment, the integrated data may be moved to another database, called the data warehouse database, where the data may be arranged into hierarchical groups called dimensions and into facts and aggregated facts. The combination of facts and dimensions are referred to as a star schema.

A business intelligence (BI) reporting tool 410 is also provided. The BI reporting tool 410 includes an application that transforms raw data (e.g. from the data warehouse 408) into meaningful and useful information for users. This may be accomplished by, for example, providing tables of data, charts, overall grade indicators and text and combinations of the above.

The system 400 functions to generate reports 412. The reports 412 are the outcome of the BI reporting tool 410. These reports may be modified by a user, so that the user can either see an item of interest, or investigate the data and look for details that are integrated into a report.

Figure 5:
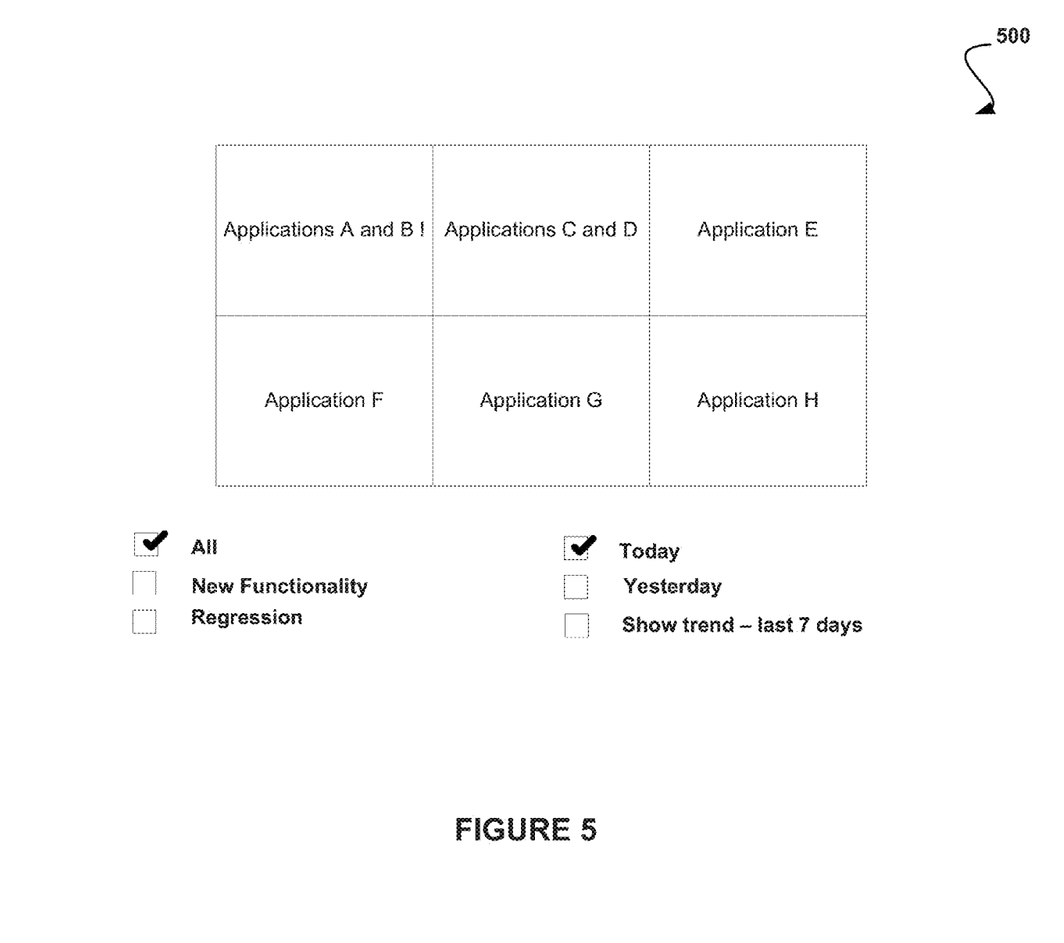
FIG. 5 shows an example of a report generated by the system of FIG. 4, in accordance with one example.

FIG. 5 shows an example report 500 generated by the system 400, in accordance with one embodiment. In this example, there are six software applications that are tested in the current testing project. In one embodiment, the color of the boxes in the report 500 may be green, indicating that the testing and the software development project are on track, and the project will meet its targets.

The upper left box, corresponding to the testing of Applications A and B, has an exclamation mark (e.g. in red etc.). This is an indication that although the overall status is "green" there is an issue that is not as planned.

Filters at the bottom of the report 500 indicate that the status is shown for all types of testing, and the report 500 presents today's status. In operation, a user may select a view of one or more testing types. The user may also select a view of different period, such as yesterday. The user can also select a "show trend" option. In response, the BI reporting application 410 may then retrieve historical data and show a trend.

Figure 6:
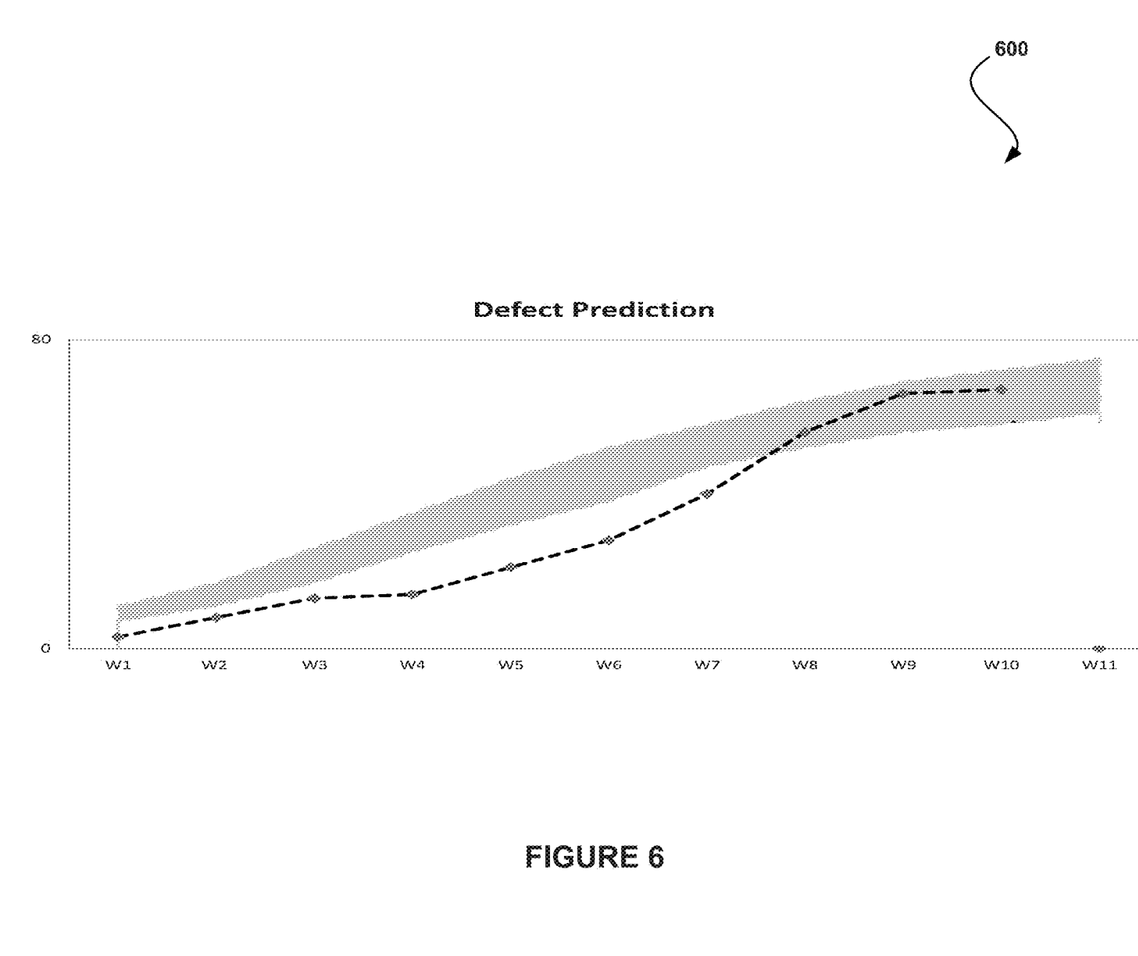
FIG. 6 is one example of a current defect detection rate compared to an expected value, in accordance with one example.

FIG. 6 shows another exemplary report generated by the system 400, in which expected test results are shown. The expected results may be calculated based on the analysis of historical data. Expected results may be shown as a range of values, per each week of the test execution period. The actual values may also be displayed, so that the user can monitor the testing progress in comparison with the expectations.

The data may be stored in the data warehouse 408 with attributes, or dimensions, that enable the accumulation, the filtering and the sorting of that data. Examples of such dimensions include version/drop number, a testing stream, a testing type (e.g. such as new functionality or regression, etc.), the application under test, the test cases and/or scenario status, a defect severity, a defect RCA (Root Cause Analysis), the tested business process, and/or a number of planned test cases/scenarios.

In one embodiment, the system 400 may implement an algorithm that predicts the quality of a software delivery, and also the number of defects that are expected to leak from the testing to the users. For example, based on past projects with similar characteristics, the system 400 may count the number of defects that have been detected at each testing stage and the number of defects that had ultimately escaped to users in past projects. The system 400 may also use the project size and other attributes of past projects. Statistical analyses, such as regression analysis, average defects per stage, median, and variance, may be used to identify patterns.

The number of defects per stage may be normalized to the size of the software development version. It can be either divided by the development effort or by other means of measuring size, such as function points. The analysis may search for a ratio between the software size or the work effort and the number of defects that are injected into the software applications and the number of defects that are detected at each testing stage. In one embodiment, the system 400 may analyze the defect detection rate during the testing period.

Based on the above inputs, the system 400 may calculate the expected number of defects that should have been detected over the course of the project up until the current stage, and then the system 400 may calculate a range of expected rate of defect detection during the current testing stage. This range is presented as the shaded area in FIG. 6.

At the same time, the system 400 may collect actual data from defect detection tools (e.g. the defect management tool 402). The number of defects is divided by the software size or the work effort of the current version, so that it is comparable to the data calculated previously.

FIG. 6 is one example of a current defect detection rate compared to the expected value. When the current detection rate, represented by the dotted line, is below the expected rate represented by the shaded area, it shows a risk, where not enough defects were detected and too many defects may escape to users. Similarly, when the current detection rate is above the expected rate, it may indicate another risk, where the more defects reside in the code than expected, and testing should be enhanced to detect more defects and later to validate more defect fixes. Based on this analysis, a manager using the system 400 may take corrective actions, such as increasing the number of testers, to reduce the risk.

In another embodiment, the system 400 may implement an algorithm that predicts the number of defects that will not be fixed before going-live, when the capacity of the development team is not sufficient to fix all defects on time.

In this case, the system 400 may count the number of defects that are detected and the number of defects that are fixed and verified during the test execution, in past versions. The system 400 may determine a pattern based on statistical analyses.

Additionally, the system 400 may analyze the average defect closure rate during the testing period. Based on these inputs, the system 400 may calculate the expected number of defects that were opened but not fixed and verified at any given time.

The system 400 may collect actual data from the defect detection tools 402. By comparing the actual data of the current system with the expected defect closure rate and current defect closure capacity, the system 400 may predict how many defects may stay unresolved at the end of the testing system, and hence the risk to go live.

The reports may be customized per need, utilizing one common data source. Data may be extracted, manipulated, stored, and analyzed automatically within a short time, thus reducing the need for manual data cleaning.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium, comprising:
   computer code for monitoring at least one current software testing project;
   computer code for receiving current defect information and current test case information associated with the at least one current software testing project;
   computer code for receiving test planning information associated with the at least one current software testing project, the test planning information including test plans for the at least one current software testing project;
   computer code for receiving overall project planning information including performance metrics associated with the at least one current software testing project;
   computer code for storing the current defect information, the current test case information, the test planning information, and the overall project planning information associated with the at least one test in at least one centralized data repository, the at least one centralized data repository further including historical test data associated with a plurality of past software testing projects;
   computer code for identifying from the at least one centralized data repository information associated with each of the plurality of past software testing projects, the information including a number of defects detected at each of a plurality of stages for each of the plurality of past software testing projects, an amount of time spent developing each stage of each of the plurality of past software testing projects, and a number of defects that escaped detection before a deployment for each of the plurality of past software testing projects;
   computer code for comparing the information associated with each of the plurality of past software testing projects to information associated with the current software testing project;
   computer code for predicting a number of defects for the current software testing project, based on the comparing;
   computer code for comparing the predicted number of defects for the current software testing project to a current number of detected defects included within the stored current defect information received for the current software testing project;

computer code for, in response to a determination that the predicted number of defects for the current software testing project is greater than the current number of detected defects included within the stored current defect information received for the current software testing project, generating a report, including:

retrieving data associated with at least one user request from the at least one centralized data repository, the data associated with at least one user request corresponding to at least one of the current defect information, the current test case information, the test planning information, the overall project planning information, or the historical test data;

transforming the data associated with the at least one user request into a format for display; and generating one or more reports utilizing the transformed data, the one or more reports including user modifiable reports and being associated with a test progress of the at least one current software testing project.

2. The computer program product of claim 1, further comprising computer code for identifying a plurality of attributes associated with at least one of the current defect information and the current test case information.

3. The computer program product of claim 2, further comprising computer code for classifying the at least one of the current defect information and the current test case information, based on the plurality of attributes.

4. The computer program product of claim 3, further comprising computer code for monitoring the at least one current software testing project utilizing the classification based on the plurality of attributes.

5. The computer program product of claim 4, wherein the computer program product is operable such that the at least one current software testing project may be monitored utilizing the classification based on the plurality of attributes for a specific area of interest.

6. The computer program product of claim 2, wherein the computer program product is operable such that the plurality of attributes include a defect status.

7. The computer program product of claim 6, wherein the computer program product is operable such that the defect status includes one of a new status, a fixed status, a verified status, and a closed status.

8. The computer program product of claim 2, wherein the computer program product is operable such that the plurality of attributes include a defect severity.

9. The computer program product of claim 8, wherein the computer program product is operable such that the defect severity includes one of a critical severity, a high severity, a medium severity, or a low severity.

10. The computer program product of claim 2, wherein the computer program product is operable such that the plurality of attributes include a defect type.

11. The computer program product of claim 10, wherein the computer program product is operable such that the defect type includes one of a functional type or a performance type.

12. The computer program product of claim 2, wherein the computer program product is operable such that the plurality of attributes include a defect origin.

13. The computer program product of claim 12, wherein the computer program product is operable such that the defect origin includes one of a code origin or a configuration origin.

14. The computer program product of claim 1, wherein the computer program product is operable such that the at least one centralized data repository functions to integrate disparate data sets.

15. The computer program product of claim 14, wherein the computer program product is operable such that the integrated disparate data sets are arranged into hierarchical groups.

16. The computer program product of claim 1, wherein the computer program product is operable such that the at least one centralized data repository further includes, for each past project of a plurality of past projects, a past rate of defect closure for each stage of the past project.

17. The computer program product of claim 1, further comprising computer code for automatically comparing a current rate of defect closure of the at least one current software testing project to past rates of defect closure of past projects, and responsive to the comparing, automatically predicting a number of future defects which will not be closed before a termination of the at least one current software testing project.

18. A method, comprising:

monitoring at least one current software testing project;

receiving current defect information and current test case information associated with the at least one current software testing project;

receiving test planning information associated with the at least one current software testing project, the test planning information including test plans for the at least one current software testing project;

receiving overall project planning information including performance metrics associated with the at least one current software testing project;

storing the current defect information, the current test case information, the test planning information, and the overall project planning information associated with the at least one test in at least one centralized data repository, the at least one centralized data repository further including historical test data associated with one or more past software testing projects;

identifying from the at least one centralized data repository information associated with each of the plurality of past software testing projects, the information including a number of defects detected at each of a plurality of stages for each of the plurality of past software testing projects, an amount of time spent developing each stage of each of the plurality of past software testing projects, and a number of defects that escaped detection before a deployment for each of the plurality of past software testing projects;

comparing the information associated with each of the plurality of past software testing projects to information associated with the current software testing project;

predicting a number of defects for the current software testing project, based on the comparing;

comparing the predicted number of defects for the current software testing project to a current number of detected defects included within the stored current defect information received for the current software testing project;

in response to a determination that the predicted number of defects for the current software testing project is greater than the current number of detected defects included within the stored current defect information received for the current software testing project, generating a report, including:

retrieving data associated with at least one user request from the at least one centralized data repository, the data associated with at least one user request corresponding to at least one of the current defect information, the current test case information, the test planning information, the overall project planning information, or the historical test data;

transforming the data associated with the at least one user request into a format for display; and generating one or more reports utilizing the transformed data, the one or more reports including user modifiable reports and being associated with a test progress of the at least one current software testing project.

19. A system comprising:

a memory system; and one or more processing cores coupled to the memory system and that are each configured to:

monitor at least one current software testing project;

receive current defect information and current test case information associated with the at least one current software testing project;

receive test planning information associated with the at least one current software testing project, the test planning information including test plans for the at least one current software testing project;

receive overall project planning information including performance metrics associated with the at least one current software testing project;

store the current defect information, the current test case information, the test planning information, and the overall project planning information associated with the at least one test in at least one centralized data repository, the at least one centralized data repository further including historical test data associated with one or more past software testing projects;

identify from the at least one centralized data repository information associated with each of the plurality of past software testing projects, the information including a number of defects detected at each of a plurality of stages for each of the plurality of past software testing projects, an amount of time spent developing each stage of each of the plurality of past software testing projects, and a number of defects that escaped detection before a deployment for each of the plurality of past software testing projects;

compare the information associated with each of the plurality of past software testing projects to information associated with the current software testing project;

predict a number of defects for the current software testing project, based on the comparing;

compare the predicted number of defects for the current software testing project to a current number of detected defects included within the stored current defect information received for the current software testing project;

in response to a determination that the predicted number of defects for the current software testing project is greater than the current number of detected defects included within the stored current defect information received for the current software testing project, generate a report, including:

retrieve data associated with at least one user request from the at least one centralized data repository, the data associated with at least one user request corresponding to at least one of the current defect information, the current test case information, the test planning information, the overall project planning information, or the historical test data;

transform the data associated with the at least one user request into a format for display; and generate one or more reports utilizing the transformed data, the one or more reports including user modifiable reports and being associated with a test progress of the at least one current software testing project.

* * * * *